United States Patent [19]

Lugscheider et al.

[11] Patent Number: 4,518,417
[45] Date of Patent: May 21, 1985

[54] METHOD OF, AND ARRANGEMENT FOR, REDUCING OXIDE-CONTAINING FINE-PARTICLE ORES

[75] Inventors: Walter Lugscheider, Linz; Alois Leutgöb, Steyr; Ernst Riegler, Enns; Paul Müllner, Traun, all of Austria

[73] Assignee: Voest-Alpine Aktiengesellschaft, Linz, Austria

[21] Appl. No.: 455,812

[22] Filed: Jan. 5, 1983

[30] Foreign Application Priority Data

Jan. 19, 1982 [AT] Austria ............................ 167/82

[51] Int. Cl.³ ............................ C21C 5/52; C22B 4/00
[52] U.S. Cl. ............................ 75/10 R; 75/11; 75/65 R; 75/93 R
[58] Field of Search ............. 75/10 R, 11, 63, 65 R, 75/93 R

[56] References Cited

U.S. PATENT DOCUMENTS

| | | | |
|---|---|---|---|
| 1,847,527 | 7/1926 | Greene | 75/11 |
| 3,422,206 | 1/1969 | Baker | 75/65 R |
| 3,843,351 | 10/1974 | Smith | 75/10 R |
| 3,862,834 | 1/1975 | von Waclawiczek | 75/10 R |
| 3,893,845 | 7/1975 | Mahaffey | 75/10 R |
| 3,900,311 | 8/1975 | Nilles | 75/60 |
| 3,917,479 | 11/1975 | Sayce | 75/10 R |
| 4,002,466 | 1/1977 | MacRae et al. | 75/11 |
| 4,298,377 | 11/1981 | Szekely | 75/93 R |

FOREIGN PATENT DOCUMENTS 506624 1/1980 Austria ............................ 75/11

Primary Examiner—Peter D. Rosenberg
Attorney, Agent, or Firm—Brumbaugh, Graves, Donohue & Raymond

[57] ABSTRACT

In a method of reducing oxide-containing fine-particle ores, the ore particles are melted and reduced in a rotationally symmetric melting vessel in the presence of solid, liquid or gaseous carbon carriers by the action of a plasma jet of a plasma burner. At least part of the ore particles to be reduced are introduced through charging openings in the side wall of the vessel and are set in a cyclonic rotational movement. The plasma jet of the plasma burner is generated within the rotating particle stream. An arrangement for carrying out the method comprises a refractorily lined melting vessel having a rotationally symmetric inner space and including charging openings for the addition of oxide-containing ore particles and fluxing agents. There are openings for solid, liquid or gaseous carbon carriers and other fluxes, and at least one plasma burner. In the side wall of the melting vessel charging lances are arranged, which are directed into the space between the side wall of the melting vessel and its central axis.

9 Claims, 6 Drawing Figures

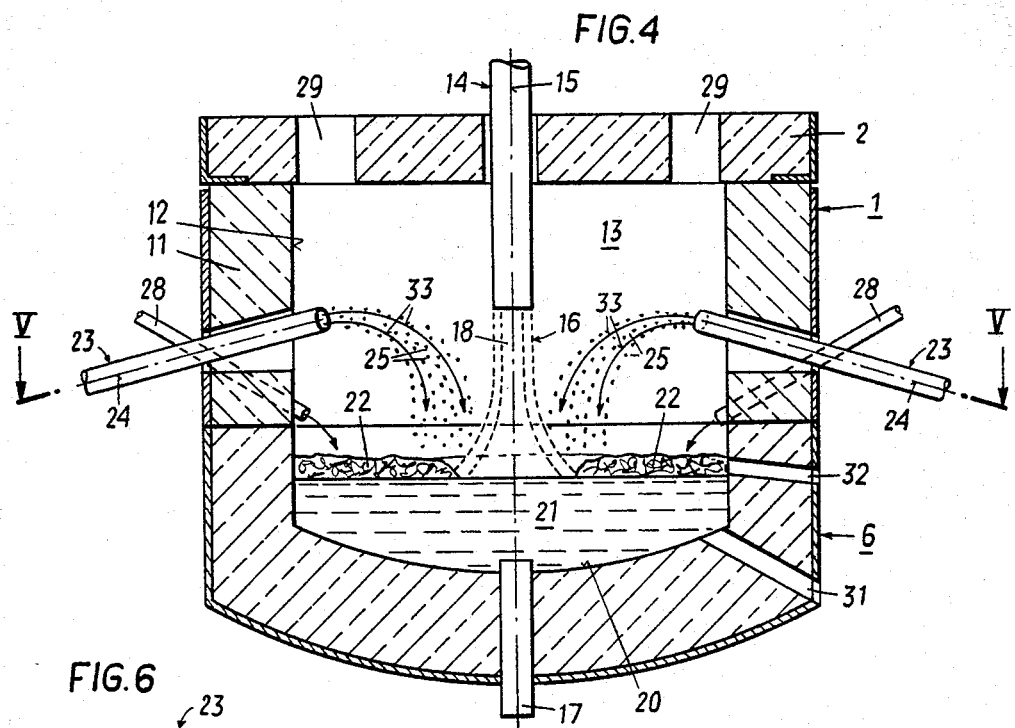
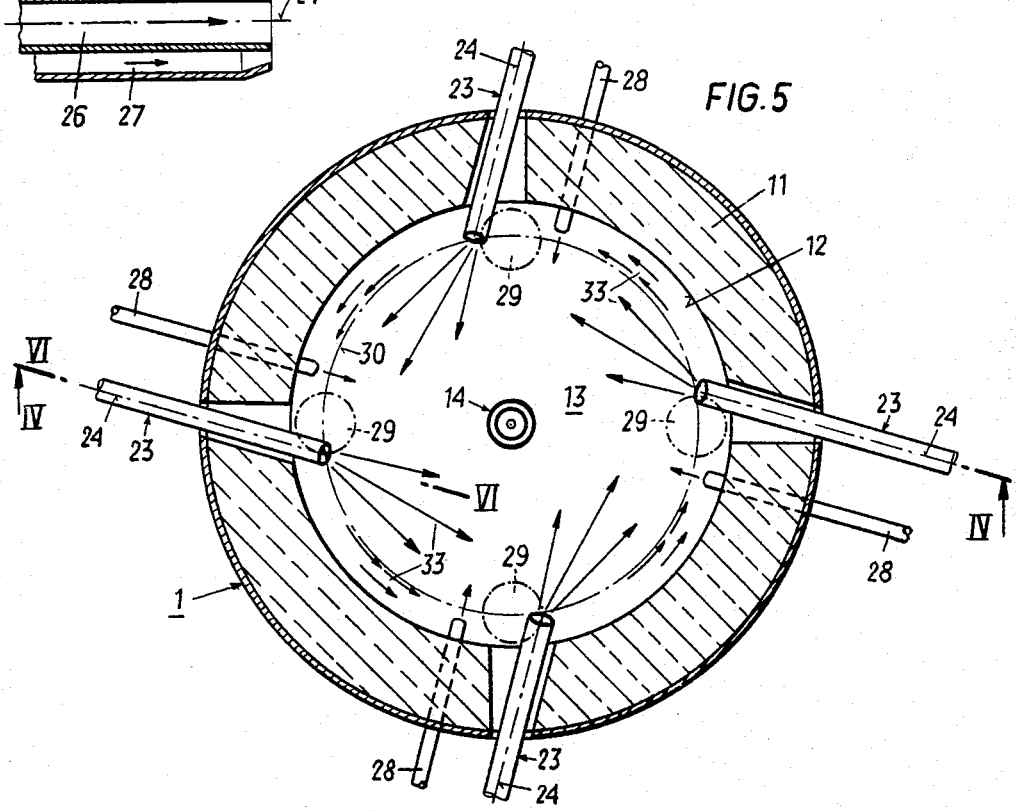

METHOD OF, AND ARRANGEMENT FOR, REDUCING OXIDE-CONTAINING FINE-PARTICLE ORES

BACKGROUND OF THE INVENTION

The invention relates to a method of reducing oxide-containing fine-particle ores, wherein the oxide-containing ore particles are melted and reduced in a rotationally symmetric melting vessel in the presence of solid, liquid or gaseous carbon carriers by the action of a plasma jet of a plasma burner, as well as to an arrangement for carrying out the method.

From Austrain Pat. No. 257,964 a method of reducing metallic oxides by means of an electric arc plasma is known. The electric arc plasma contains a hydrocarbon gas, which serves as a reduction gas. The plasma arc is struck between a plasma burner, vertically arranged in the cover, and a bottom electrode arranged in the bottom of a melting vessel. The metal melt forming is covered by a slag layer. The reduction of the metal oxides takes place in the slag layer. The carbon and/or hydrogen must be prevented from contacting the molten metal bath, since otherwise there exists the danger that carbon will become dissolved, resulting in an undesirable carbon increase. Furthermore, there would be the risk of hydrogen diffusing into the metal melt.

This known method has the disadvantage that the thermal energy dissipating from the electric arc plasma constitutes a big load on the refractory lining of the melting vessel, since the strongest heat radiation occurs perpendicular to the axis of the plasma jet. On account of this fact, the service life of the lining of the melting vessel is relatively short. Furthermore, a sufficiently thick slag layer always must be maintained, since the reduction has to take place in the slag layer and in its surface, respectively. Reduction gases must not reach the metal bath.

From the published European application No. 0,037,809-A1 a method for producing molten pig iron is known, according to which prereduced oxide-containing raw-material particles are top-charged into a fluidized bed, formed by carbon particles and an oxygen-containing carrier gas, through the cover of the melting vessel. As they travel through the same, the particles are heated, completely reduced and melted, additional energy being supplied to the fluidized bed by an additional firing that is designed as a plasma heating. With this known method it is necessary to use a strongly prereduced ore (prereduced to approximately 60 to 80%). In the melting vessel, thus prereduced ore merely is subjected to an afterreduction.

The invention has as its object to provide a method, and an arrangement for carrying out the method, which makes possible to get from the ore to the molten metal in one single step and in one single melting vessel. In particular, metals having low carbon contents are to be attained. Furthermore, the melting vessel, in particular its brickwork, is to have a long service life despite high energy loads, and the energy supplied is to be optimally utilized.

SUMMARY OF THE INVENTION

This object is achieved according to the invention in that at least part of the oxide-containing ore particles to be reduced are introduced through charging openings in the side wall of the vessel and are set in a cyclonic rotational movement, and that the plasma jet of the plasma burner is generated within, preferably in the center of, the rotating particle stream.

An arrangement for carrying out the method comprises a refractorily lined melting vessel having a rotationally symmetric inner space, including charging openings for the addition of oxide-containing ore particles as well as for fluxing agents, and openings for solid, liquid or gaseous carbon carriers and other fluxes, as well as one or more plasma burners. The side wall of the melting vessel has charging lances arranged therein, which are directed into the space between the side wall of the melting vessel and its central axis.

In order to achieve a longer dwell time of the ore particles above the metal sump forming, the charging lances are preferably directed obliquely upwards.

In order to be able to control the reduction process well, and to adapt it to the respective ore, the charging lances preferably are cardanically mounted.

For the supply of reduction gas and/or oxygen, additional lances are preferably arranged in the side wall of the vessel, which are directed obliquely downwards and towards the surface of the metal sump forming.

The optimum utilization of energy of the plasma jet of the plasma burner is ensured if the plasma burner is arranged in the central axis of the melting vessel and cooperates with a bottom electrode.

Suitably, the charging lances are designed as jacket nozzles, the interior of each jacket nozzle being destined to supply ore particles and the annular space surrounding the interior of each jacket nozzle being destined to supply reduction gas.

For charging during the start-up of the reduction process, several charging openings in the form of a side-wall-near ring are additionally arranged in the cover of the melting vessel.

BRIEF DESCRIPTION OF THE DRAWINGS

The invention will now be explained in more detail by way of the drawings, wherein:

FIG. 4 is a sectional view taken along line IV—IV of FIG. 5;

FIG. 5 is a sectional view taken along the line V—V of FIG. 4; and

FIG. 6 illustrates a charging lance sectioned along the line VI—VI of FIG. 5.

DESCRIPTION OF EXEMPLARY EMBODIMENT

Figure 2:
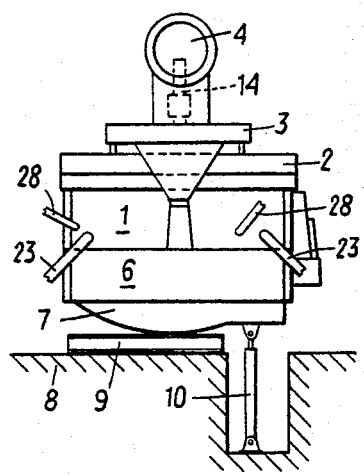
FIG. 2 is a view taken along the direction of the arrow II of FIG. 1.
Figure 1:
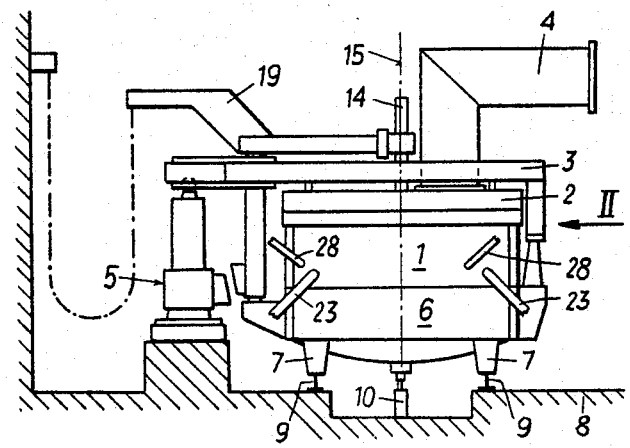
FIG. 1 is a side view of a plasma furnace in accordance with the present invention.
Figure 3:
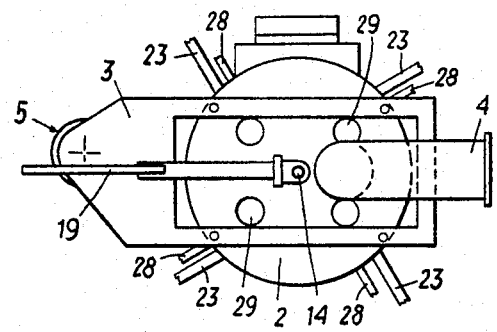
FIG. 3 is a ground plan view in schematic illustration of the furance of FIG. 1.

A furnace upper part 1 of a melting vessel designed as a plasma melting furnace is provided with a cover 2 carried by a cover carrying structure 3. From the cover, a smoke gas bend 4 projects to an exhaust (not illustrated). Laterally beside the furnace upper part 1 the cover lifting means and the cover pivoting means 5 are arranged. The furnace lower part 6, via movable beams 7, rests on runways 9 supported on the base 8. The hydraulic drive for tilting the plasma melting furnace is denoted by 10. As can be seen from FIG. 5, the side wall 12 of the plasma melting furnace, which is provided with a refractory lining 11, is designed to be rotationally symmetric.

A plasma burner 14 projecting through the cover 2 into the rotationally symmetric inner space 13 coincides, with its axis, with the axis 15 of the inner space 13. Its plasma jet 16 is struck to a water-cooled bottom electrode 17, which is arranged also in the central axis 15 of the melting vessel.

Plasma gas 18, preferably argon, is supplied to the plasma jet 16 through the plasma burner 14, which is adjustable in height to different amounts used. The supply of energy, inert gas and cooling water to the plasma burner 14 is effected via an extension arm 19 on the cover 2.

The liquid metal sump 21 gathering on the bottom 20 of the plasma melting furnace is covered by a slag layer 22. In the side wall 12 of the plasma melting furnace charging lances 23 are arranged, which, suitably, are cardanically suspended so that their axes 24 may be aligned according to the operational conditions prevailing in the furnace. The supply conduits leading to the charging lances 23 are not illustrated in the drawing.

As illustrated in FIG. 5, the charging lances 23, which are evenly distributed in the side wall 12 of the furnace, are directed in the same direction into the space between the side wall 12 of the furnace and its central axis 15, so that the stock 25 (fine-particle ore) charged through the charging lances is set in a cyclonic rotational movement. In the center of this rotational movement there is the plasma jet 16.

From FIG. 4 it is evident that the charging lances 23 additionally are directed obliquely upwardly.

The charging lances 23 are designed as jacket nozzles, their central inner space 26 being destined to supply ore particles and the annular space 27 surrounding the inner space 26 being destined to supply reduction gas.

In the side wall 12 of the furnace, further lances 28 for supplying reduction gas and/or oxygen are arranged, which are directed obliquely downwardly towards the surface of the metal sump 21 and the slag layer 22.

In the cover 2 of the furnace, further charging openings 29 are provided, which are arranged along a ring 30 in whose center the plasma burner 14 is located, these additional charging openings 29 being close to the side wall 12 of the furnace. In the vicinity of the bottom 20 of the furnace, a metal tap hole 31 is arranged. Above the same, a slag tap hole 32 is provided.

The plasma melting furnace according to the invention functions in the following manner:

After the first charging with a solid or a liquid charge through the charging openings 29, the plasma burner is ignited and the solid-particle portion is melted.

Through the charging lances 23 arranged about the periphery of the furnace, fine ores, ore dusts, coal, coal dust and/or dried blast-furnace-gas washing slurry as well as other solid particles to be reduced are nozzled in together with reduction gas, preferably hydrocarbons. If coal (coal dust) is nozzled in in addition to ore, the former is gasified into CO in the furnace space, which is also used as reduction gas. The lances 28 serve to additionally blow reduction gases and/or oxygen into the inner space 13, if desired.

By the fact that the solid particles charged carry out a cyclonic rotational movement along the side wall 12 of the melting vessel around the plasma jet 16, as is illustrated in FIG. 5 by the arrows 33, the solid particles charged form a protective coat for the refractory lining 11 of the furnace on the one hand, and an intimate mixture of the ore particles with the reduction gas is effected on the other hand.

On account of the high thermal energy reflected perpendicular to the plasma jet 16, the solid particles are largely melted already in the inner space 13 prior to getting into contact with the liquid metal sump 21 and are simultaneously reduced—as a result of the reducing atmosphere (due to reduction gases nozzled in). On account of the high thermal energy perpendicular to the axis of the plasma jet 16, a rapid decomposition reaction of the hydrocarbons into reducing constituents (e.g., C, $H_2$) results.

The melted metal falls through the slag layer 22, where it can be reduced further, into the liquid metal sump 21.

By blowing in reduction gas and/or oxygen in doses through the lances 28, an optimum reduction (the highest recovery possible of reduced metal) of the ore or ore dusts by minimizing the electric energy of the plasma burner 14 is attained. This minimization can be achieved primarily by producing additional heat to the plasma heat by burning, e.g., carbon with oxygen.

The continuous charging during the furnace operation is not limited to charging through the laterally arranged charging lances 23, but, if required, can be effected also through the charging openings 29 provided in the cover 2 of the plasma melting furnace.

By the separate supply of plasma gas and reduction gas, both gas streams can be controlled in accordance with the desired arc length (with full electric power-)—in dependence on the piece-dust stock ratio of the ore available on the one hand as well as on the charge to be reduced on the other hand, without interfering with each other.

A particular advantage of the method according to the invention resides in the possibility of producing ferroalloys (FeCr, FeMn, FeSi) having low carbon contents (as a result of a lower carburization when operating with plasma energy) economically and in a single method step from the ore to the molten metal.

According to the known methods, several method steps, such as melting and subsequent decarburization in AOD-converters, are necessary to this end.

What we claim is:

1. In a method of reducing oxide-containing fine-particles ores to be carried out in a rotationally symmetric melting vessel provided with plasma-jet generating plasma burning means, side walls and charging openings, by melting and reducing the oxide-containing ore particles in the presence of at least one of solid, liquid and gaseous carbon carriers by action, the improvement comprising at least a portion of the oxide-containing ore particles to be reduced being introduced laterally through said charging openings provided in said side walls and being set in a cyclonic rotational movement to produce a rotating particle stream, and wherein the plasma jet of said plasma burner means is generated along a substantially vertical axis of said melting vessel and surrounded by said rotating particle stream.

2. A method as set forth in claim 1, wherein said plasma jet is generated in the center of said particle stream.

3. An arrangement for reducing oxide-containing fine-particle ores comprising
    a refractorily lined melting vessel having a side wall defining a rotationally symmetric inner space to accommodate a metal sump, charging openings, including charging lances, provided in said side wall for charging oxide-containing ore particles and fluxing agents, said charging lances being located symmetrically about said side wall and directed into a space formed between said side wall and a substantially vertical central axis of said melting vessel so as to produce a rotating particle stream, further openings for supplying at least one of solid, liquid and gaseous carbon carriers, and other fluxing agents, and at least one plasma burner so arranged that its plasma jet is generated along said central axis of said melting vessel and surrounded by said rotating particle stream.

4. An arrangement as set forth in claim 3, wherein said charging lances additionally are directed obliquely upwards.

5. An arrangement as set forth in claim 3 or 4, wherein said charging lances are cardanically mounted.

6. An arrangement as set forth in claim 3 or 4, further comprising additional lances arranged in said side wall of said melting vessel for supplying at least one of reduction gas and oxygen, said additional lances being directed obliquely downwards to the surface of said metal sump forming.

7. An arrangement as set forth in claim 3, and further comprising a bottom electrode cooperating with said plasma burner.

8. An arrangement as set forth in claim 3, wherein said charging lances are designed as jacket nozzles, each jacket nozzle comprising a nozzle interior and an annular space surrounding said nozzle interior, said nozzle interior being used to supply ore particles and said annular space being used to supply reduction gas.

9. An arrangement as set forth in claim 3, wherein said melting vessel has a cover for accommodating a plurality of additional charging openings arranged close to said side wall in a ring-shaped manner.

* * * * *

UNITED STATES PATENT AND TRADEMARK OFFICE
CERTIFICATE OF CORRECTION

PATENT NO. : 4,518,417

DATED : May 21, 1985

INVENTOR(S) : Lugscheider et al.

It is certified that error appears in the above-identified patent and that said Letters Patent is hereby corrected as shown below:

First page, 2nd col., 3rd line, "Austria" should read
--Australia--;

Col. 2, line 46, "furance" should read --furnace--;

line 47, after "along" insert --the--; and

Col. 4, line 52, after "by" insert --plasma jet--.

Signed and Sealed this

Tenth Day of September 1985

[SEAL]

Attest:

DONALD J. QUIGG

Attesting Officer    Acting Commissioner of Patents and Trademarks - Designate